US008365918B1

(12) United States Patent
Andino

(10) Patent No.: US 8,365,918 B1
(45) Date of Patent: Feb. 5, 2013

(54) EMERGENCY NOTIFICATION FLASHING SYSTEM

(76) Inventor: Jose E. Andino, Miami, FL (US)

( * ) Notice: Subject to any disclaimer, the term of this patent is extended or adjusted under 35 U.S.C. 154(b) by 199 days.

(21) Appl. No.: 13/009,556

(22) Filed: Jan. 19, 2011

Related U.S. Application Data

(60) Provisional application No. 61/296,144, filed on Jan. 19, 2010.

(51) Int. Cl.
B65D 71/00 (2006.01)
F21V 33/00 (2006.01)

(52) U.S. Cl. ........ 206/573; 362/154; 362/184; 362/253; 206/223

(58) Field of Classification Search .................. 362/154, 362/184, 253, 155; 206/223, 573, 335, 803
See application file for complete search history.

(56) References Cited

U.S. PATENT DOCUMENTS

| 2,638,583 | A | 5/1953 | Edwards et al. |
| 3,589,328 | A | 6/1971 | Kiniry et al. |
| 4,609,976 | A | 9/1986 | Geissler |
| 4,830,579 | A * | 5/1989 | Cheng ............... 417/234 |
| 4,875,028 | A | 10/1989 | Chou |
| 5,154,600 | A * | 10/1992 | Sylvestre ............ 431/253 |
| 5,412,548 | A | 5/1995 | Yee |
| 5,572,820 | A | 11/1996 | Mallory |
| 5,651,636 | A | 7/1997 | Yeh |
| 5,775,253 | A | 7/1998 | Quan et al. |
| 6,405,378 | B1 | 6/2002 | Garner |
| 6,773,132 | B2 * | 8/2004 | Gilligan et al. .......... 362/119 |
| 6,808,291 | B1 | 10/2004 | Aylward et al. |
| 2001/0020903 | A1 | 9/2001 | Wang |
| 2001/0028561 | A1 * | 10/2001 | Pitts ..................... 362/84 |

* cited by examiner

Primary Examiner — John A Ward
(74) Attorney, Agent, or Firm — Montgomery Patent & Design; Robert C. Montgomery

(57) ABSTRACT

An emergency notification flashing system comprising a warning triangle, a flashlight, and a caution vest to alert oncoming motorists to a disabled vehicle, an accident, or similar hazard is herein disclosed. The warning triangle and the flashlight are placed on the roadside next to the disabled vehicle or accident. The warning triangle and the flashlight comprise a plurality of illumination means which visually alert oncoming vehicle and pedestrians of the upcoming hazard. A user is to wear the caution vest which includes reflective means to alert oncoming vehicles and pedestrians. The warning triangle, flashlight, and caution vest are stored within a case when not in use.

20 Claims, 9 Drawing Sheets

EMERGENCY NOTIFICATION FLASHING SYSTEM

RELATED APPLICATIONS

The present invention was first described in and claims the benefit of U.S. Provisional Application No. 61/296,144 filed Jan. 19, 2010, the entire disclosures of which are incorporated herein by reference.

FIELD OF THE INVENTION

The present invention relates generally to roadside warning devices, and in particular, to a portable kit providing a plurality of flashing roadside notification devices to warn oncoming traffic of the presence of a user and a vehicle in poor visibility conditions.

BACKGROUND OF THE INVENTION

Street and highway safety is one of the foremost concerns of public safety. As the number of automobiles in service continues to increase, so too the number of deaths and injuries resulting from traffic accidents has increased proportionally. Many of these incidents are a result of a vehicle breaking down which results in a person pulling the vehicle along the side of road and exiting the vehicle in order to inspect or repair it. During this time, that person and vehicle can be extremely difficult to see and this situation can subsequently end in a major accident if a passing vehicle strikes either the vehicle or the person. In an effort to increase driver awareness and visibility, law enforcement officers, truck drivers, and regular motorists often keep road flares in their vehicle to provide warning for oncoming vehicles in such situations.

While such flares do work, there are a number of issues associated with their use. Firstly, they are incendiary devices that may pose a safety risk. Additionally, such flares often have only a limited burn time, which may not be long enough to clear the vehicles. Finally, after the task is completed the flares are difficult to extinguish and are often just thrown off of the side of the road which can cause additional incidents such as littering, risk to wildlife, or even fires.

Various attempts have been made to provide roadside emergency signaling devices of various electrical types. Examples of these attempts can be seen by reference to several U.S. patents, including U.S. Pat. No. 3,589,328; U.S. Pat. No. 4,609,976; U.S. Pat. No. 4,875,028; U.S. Pat. No. 5,651,636; U.S. Pat. No. 5,775,253; and U.S. Pat. No. 6,808,291. However, none of these designs are similar to the present invention.

While these devices fulfill their respective, particular objectives, each of these references suffer from one (1) or more of the aforementioned disadvantages. Many such devices are not sufficiently visible or proactive in terms of alerting oncoming vehicles. Moreover, many such devices are limited as to where and how they can be positioned and operated. Also, many such devices are difficult to transport constantly in a secure and unobtrusive manner. Furthermore, many such devices do not provide a range of signaling adapted to protect a user and a vehicle thoroughly and simultaneously. In addition, many such devices do not actively. Accordingly, there exists a need for an emergency notification system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a readily portable emergency notification system which alerts oncoming traffic using a range of simple, effective components adapted to accommodate both a user and a vehicle. Thus, the object of the present invention is to solve the aforementioned disadvantages and provide for this need.

To achieve the above objectives, it is an object of the present invention to provide a three (3) piece road safety kit that is utilized collaboratively to alert oncoming motor vehicles and pedestrians of a disabled vehicle, an accident, or a similar hazard along a roadside. The system includes an emergency triangle, an emergency flashlight, an emergency vest, and a case.

Another object of the present invention is to provide an illuminating warning to oncoming vehicles and pedestrians with the triangle. The triangle includes a plurality of light-emitting diodes (LED's) along an outer surface. The triangle can be placed upright on a ground surface such that the lights face oncoming traffic or another desired location. The LED's can be operated in either a solid lighting state or in one (1) of a plurality of different speed flashing states which are selected using a power switch disposed along an exterior surface of the triangle.

Yet still another object of the present invention is to provide a handheld illuminating warning using the flashlight. The flashlight includes a plurality of LED's housed within a transparent upper portion and a cylindrical grip along a lower portion. The flashlight can be used in a manner similar to a common flashlight to aid a user in inspecting a vehicle and to alert oncoming vehicles and pedestrians.

Yet still another object of the present invention is to allow a user to place the flashlight along a ground surface in an upright manner using a plurality of retractable legs pivotally attached to the upper portion of the body. When placed along a ground surface, the flashlight can be utilized in a manner similar to the triangle. The LED's of the flashlight LED's can also be operated in either a solid lighting state or in one (1) of a plurality of different speed flashing states using a flashlight power switch.

Yet still another object of the present invention is to provide increased visibility of the user with the reflective emergency vest. The vest includes an adjustable fastening means to secure over a user's upper body and a reflective striping bonded to an exterior portion of the vest. The reflective stripping reflects incident light and is envisioned to provide increased visibility of the user in conjunction with the triangle and flashlight, particularly when the triangle and flashlight are flashing. The vest further includes a warning insignia across a rear layer of the vest constructed of a similar reflective material to the striping.

Yet still another object of the present invention is to facilitate compact and secure storage of the system within the case. The triangle includes a hinge which allows a user to foldingly collapse the triangle for storage in the case. The case is arranged in a hinged "clam-shell" manner and further includes a hard, protective exterior, a handle, and a foam rubber interior. The interior of the case includes a plurality of compartments which correspondingly receive the triangle, flashlight, and vest.

Yet still another object of the present invention is to provide a method of utilizing the device that provides a unique means of transporting the case to a desired location; removing the triangle, flashlight, and vest from the case; activating the triangle illumination means to a desired solid or flashing state; positioning the emergency triangle in the desired location, preferably along the roadside; utilizing the flashlight in a common manner; standing the emergency flashlight in an upright orientation using the legs; activating the flashlight LED's in a desired solid or flashing state; placing the vest onto the user; enabling the reflective striping to alert other motorist and pedestrians; and, storing the triangle, flashlight, and vest in the case after use.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
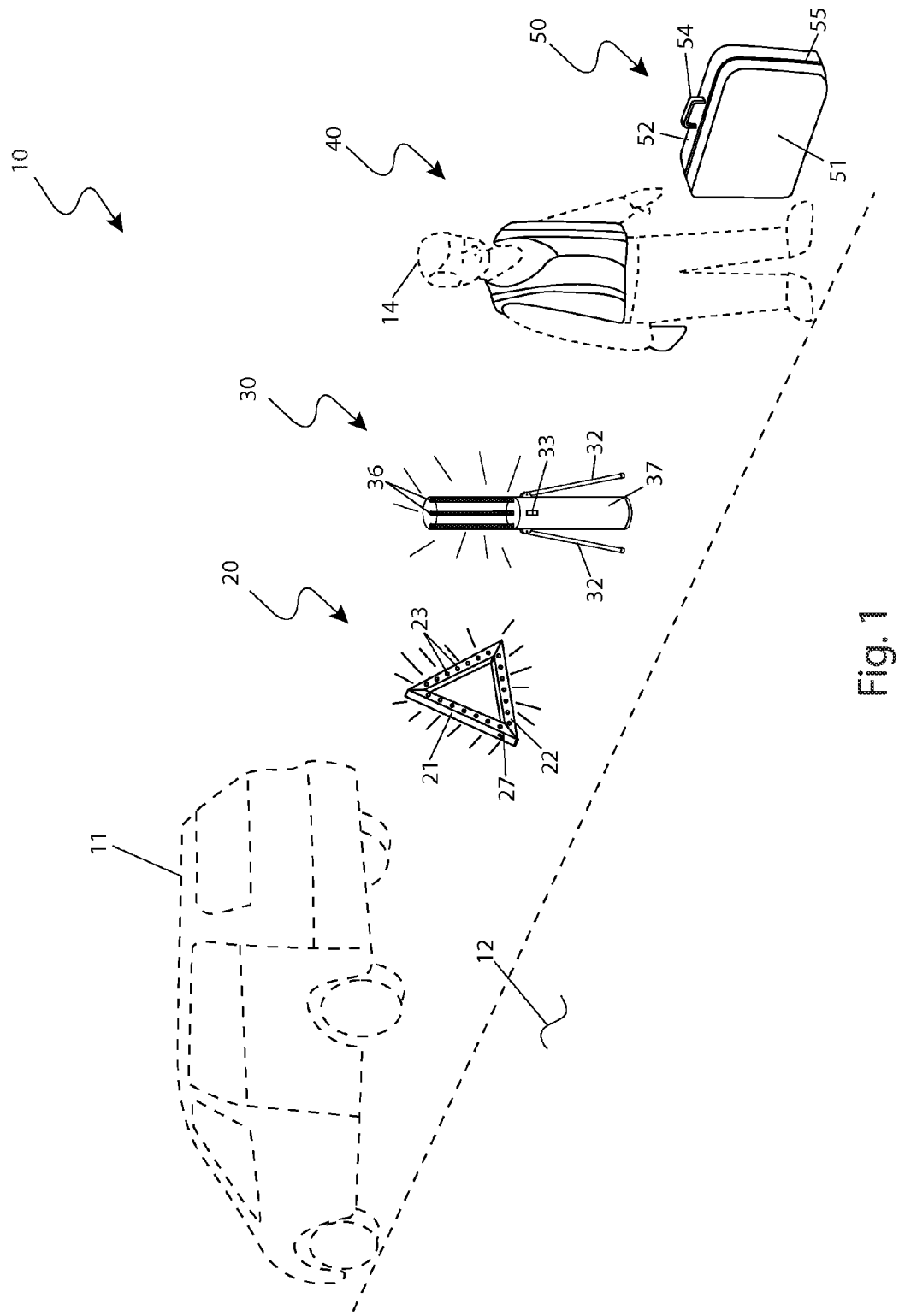
FIG. 1 is an environmental view of an emergency notification flashing system 10, according to the preferred embodiment of the present invention.

DESCRIPTIVE KEY 10 emergency notification flashing system
11 vehicle
12 roadside
14 user
20 emergency triangle
21 triangular housing
22 front surface
23 triangle illumination means
24 rear surface
25 triangle battery compartment
26 triangle battery
27 triangle power switch
28 triangle hinge
29 triangle clasping means
30 emergency flashlight
31 flashlight battery
32 leg
33 leg support
34 axle
35 flashlight illumination means
36 transparent upper portion
37 body
38 flashlight power switch
39 flashlight battery lid
40 emergency vest
42 front layer
43 rear layer
44 fastening means
45 reflective striping
47 warning insignia
50 case
51 first shell
52 second shell
53 hinge
54 handle
55 zipper
56 pocket
57 flashlight cavity
58 triangle cavity
59 strap
60 triangle microprocessor
65 electrical wiring
62 flashlight microprocessor

DETAILED DESCRIPTION OF THE PREFERRED EMBODIMENT

The best mode for carrying out the invention is presented in terms of its preferred embodiment, herein depicted within FIGS. 1 through 11. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an emergency notification flashing system (herein described as the "system") 10 which provides a means for oncoming traffic or pedestrians to be alerted of a disabled vehicle 11, an accident, or similar hazard. The system 10 comprises a plurality of emergency warning devices to provide a visual warning to alert oncoming traffic or pedestrians.

Referring now to FIG. 1, an environmental view of the system 10, according to the preferred embodiment of the present invention is disclosed. The system 10 comprises a three-piece road safety kit that when utilized collaboratively, oncoming motor vehicles 11 and pedestrians may readily be alerted of a disabled vehicle 11, vehicular accident, or similar hazard along a roadside 12 or similar location. The system 10 comprises an emergency triangle 20, an emergency flashlight 30, an emergency vest 40, and a case 50 to store and carry the items aforementioned. A user 14 may remove all or as many items from the case 50 and place them next to the disabled vehicle 11 which warns oncoming traffic or pedestrians.

Figure 2:
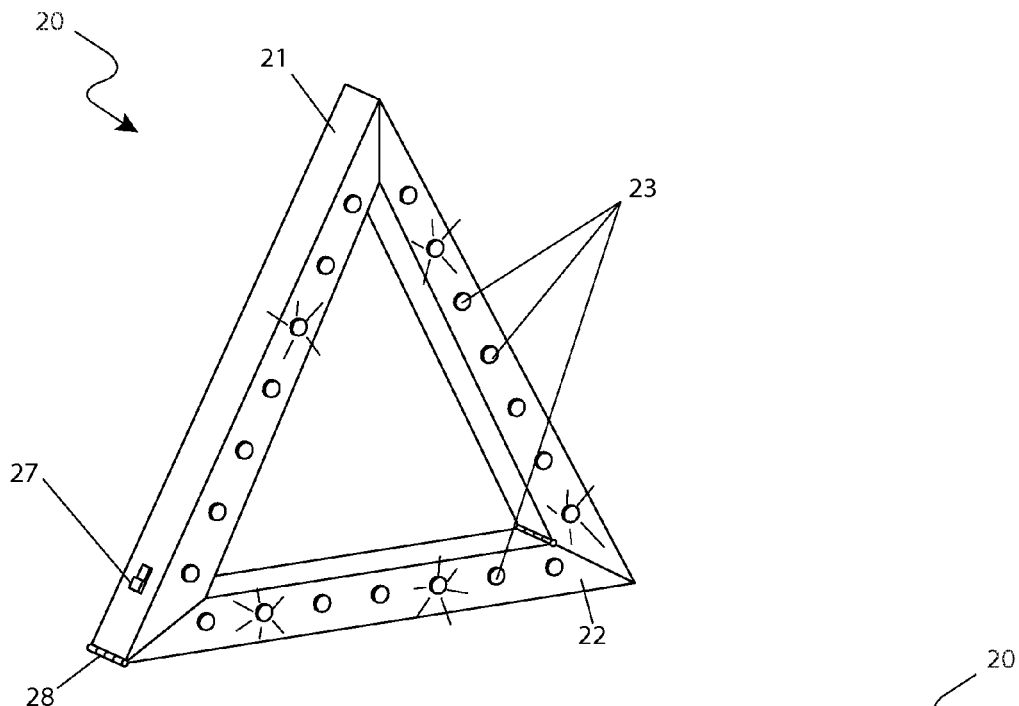
FIG. 2 is a front perspective view of an emergency triangle 20, according to the preferred embodiment of the present invention.
Figure 3:
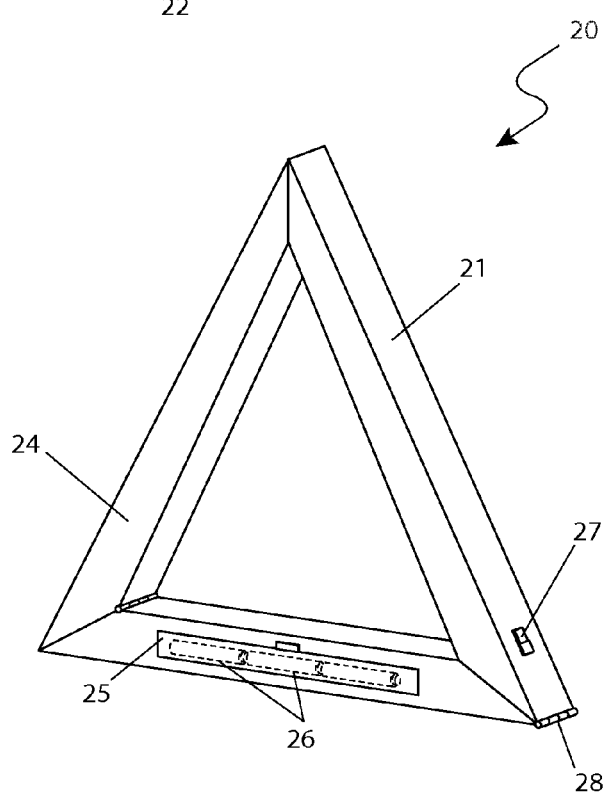
FIG. 3 is a rear perspective view of the emergency triangle 20, according to the preferred embodiment of the present invention.
Figure 4:
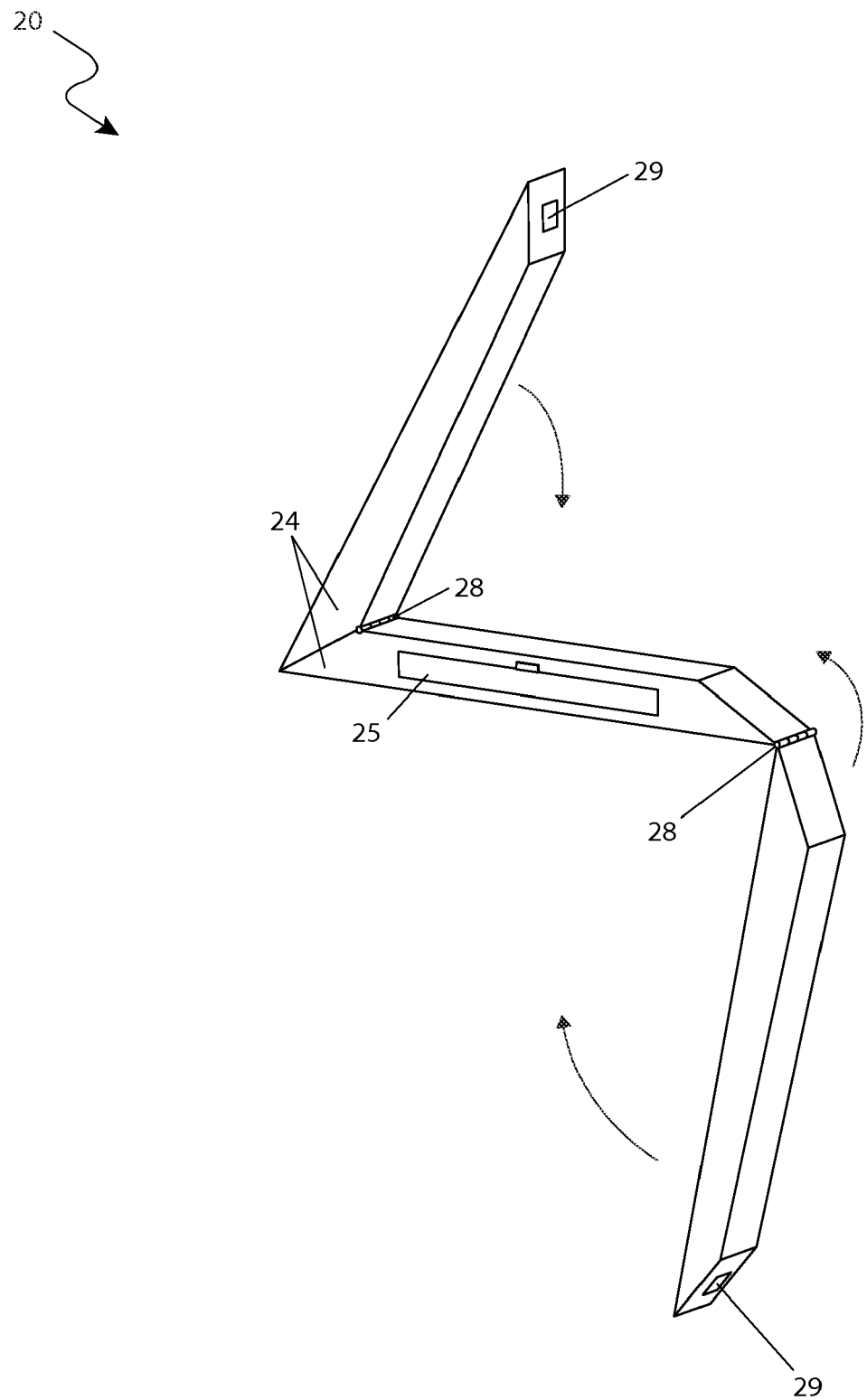
FIG. 4 is another rear perspective view of the emergency triangle 20 depicting a partially collapsed state, according to the preferred embodiment of the present invention.
Figure 5:
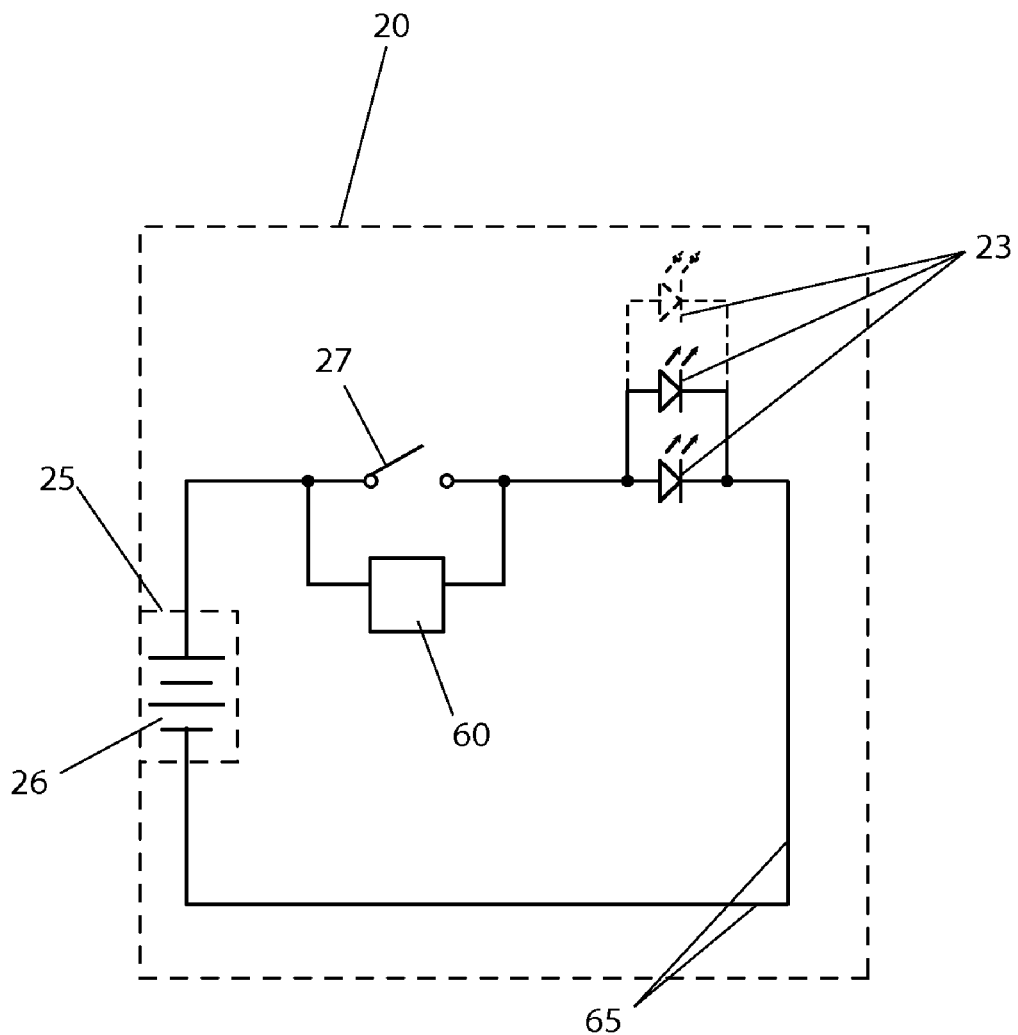
FIG. 5 is an electrical block diagram of the emergency triangle 20, according to the preferred embodiment of the present invention.

Referring now to FIG. 2, a front perspective view of the emergency triangle 20, FIG. 3, a rear perspective view of the emergency triangle 20, FIG. 4, another rear perspective view of the emergency triangle 20 depicting a partially collapsed state, and FIG. 5, an electrical block diagram of the emergency triangle 20, according to the preferred embodiment of the present invention are disclosed. The emergency triangle 20 is utilized as an illuminating warning to oncoming vehicles 11 or pedestrians. The emergency triangle 20 comprises a three (3) section triangular housing 21 which is fabricated from an impact resistant plastic or synthetic material in an injection molding process that would likely require the design and use of custom molds. The emergency warning triangle 20 forms a three-sided shape that remains stable and visible in various positions. The emergency triangle 20 is positioned upon one (1) of the three (3) sections in an upright orientation with a front surface 22 positioned toward the oncoming vehicles 11 or pedestrians preferably supported by the side having the batteries 26.

The front surface 22 comprises a plurality of triangle illumination means 23 which are preferably a plurality of light-emitting diodes (LED's) arranged in a predetermined pattern. The triangle illumination means 23 may be of any color which will corresponds to the user's 14 preference such as red, blue, yellow, and more without limiting the scope of the system 10. The triangle illumination means 23 may illuminate in a solid state or flashing state which is selected via a triangle power switch 27. The triangle power switch 27 is depicted as being positioned on an outer side of the triangular housing 21 for illustration purposes only it is known that other positions may be utilized without limiting the scope of the system 10. The triangle switch power 27 is preferably a multi-positional electronic device which is in electrical communication with the power source, i.e. triangle battery 26, and the triangle illumination means 23. The triangle battery 26 is preferably common user replaceable batteries or which are accessed via a triangle battery compartment 25 located upon a rear surface 24 of the triangular housing 21. The triangle illumination means 23 will need to be in electrical communication with a triangle microprocessor 60 that would allow provide the emergency triangle 20 with the options to illuminate the area with a solid stream of light from the triangle illumination means 23, illuminate in a slow flashing rate, illuminate in a high flashing rate, and to be turned off completely. The flashing features of the illumination means 23 will increase the likely hood of gathering the attention to those near the scene. The rate at which the illumination means 23 flash will occur could also signify the urgency of the situation. The interconnection between the triangle battery 26, triangle power switch 27, triangle microprocessor 60, and triangle illumination means 23 is created with appropriately gauged electrical wiring 65.

The emergency triangle 20 may also be collapsed for storage. A triangle hinge 28 is located at an outer edge of one (1) of the sections of the triangular housing 21 and another triangle hinge 28 is located at an opposing inner edge of another one (1) of the sections of the triangular housing 21. The triangle hinges 28 enable the respective sides to pivot inwardly or outwardly, as illustrated in FIG. 4. In a fully collapsed state each section of the triangular housing 21 is folded parallel to one (1) another for compact storage. An inner pinnacle edge of opposing sections of the triangular housing 21 includes a triangle clasping means 29 which is preferably magnetic to secure sections together when in an upright state (shown in FIG. 2).

Figure 6:
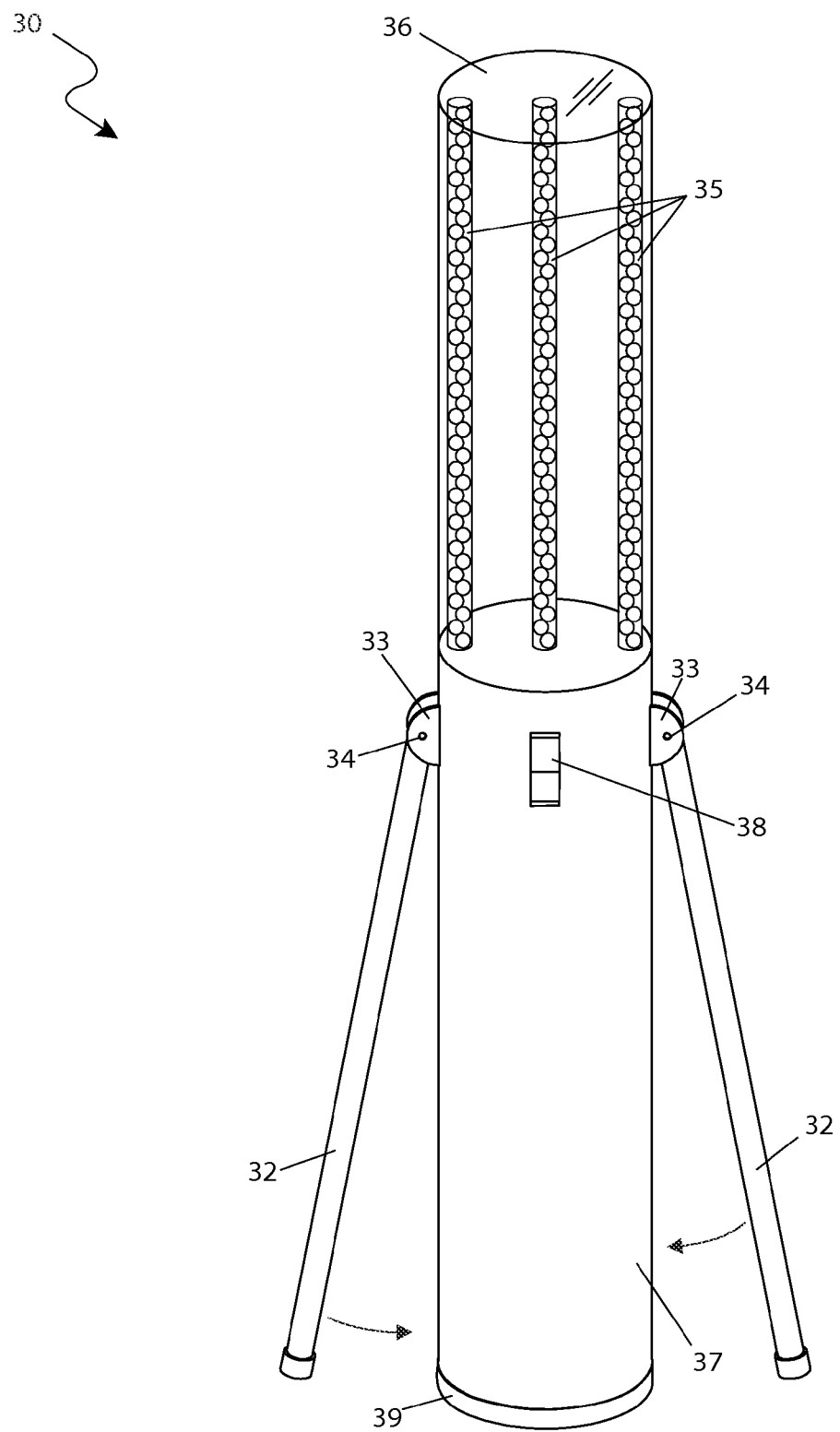
FIG. 6 is a front perspective view of an emergency flashlight 30, according to the preferred embodiment of the present invention.
Figure 7:
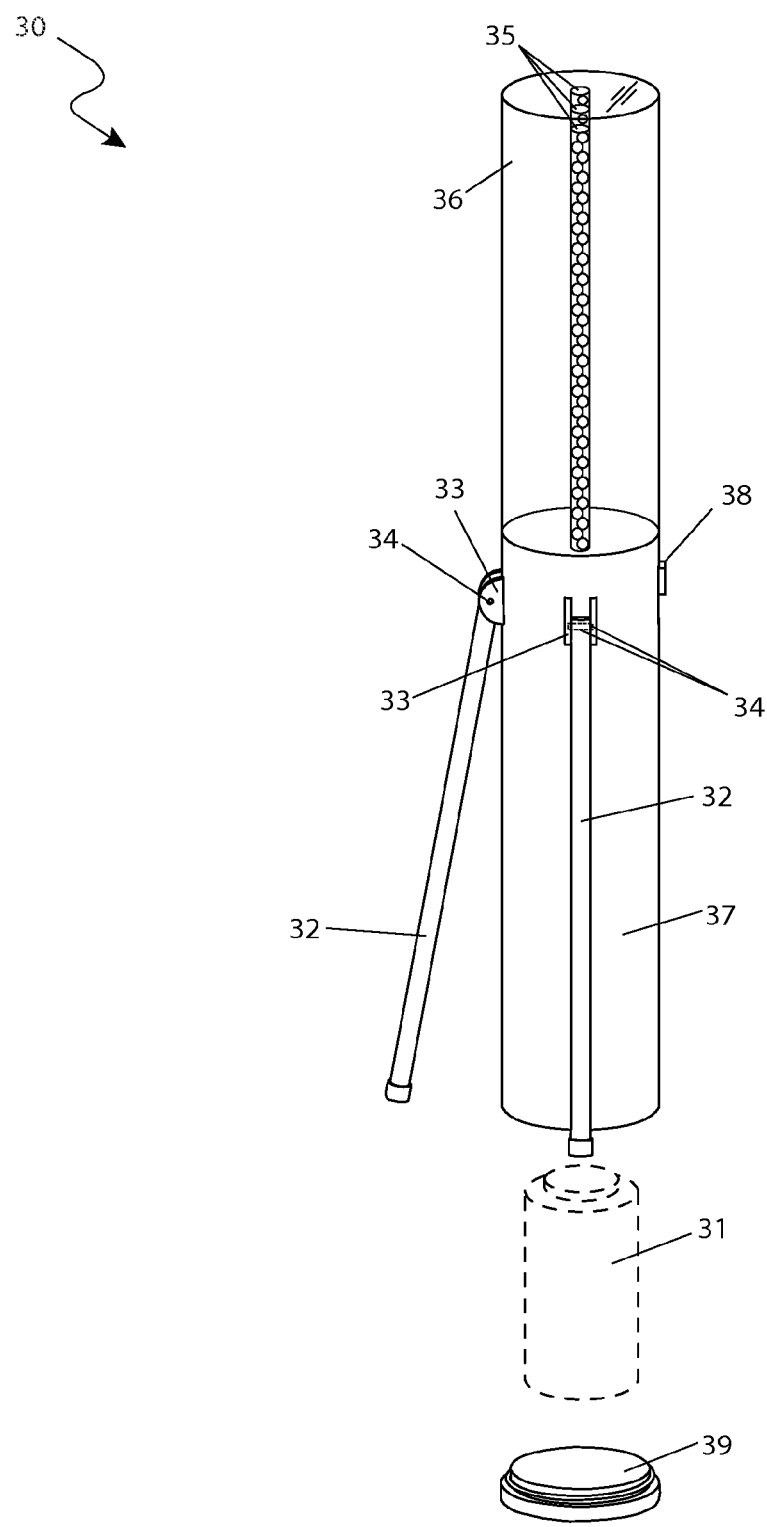
FIG. 7 is a side perspective view of the emergency flashlight 30, according to the preferred embodiment of the present invention.
Figure 8:
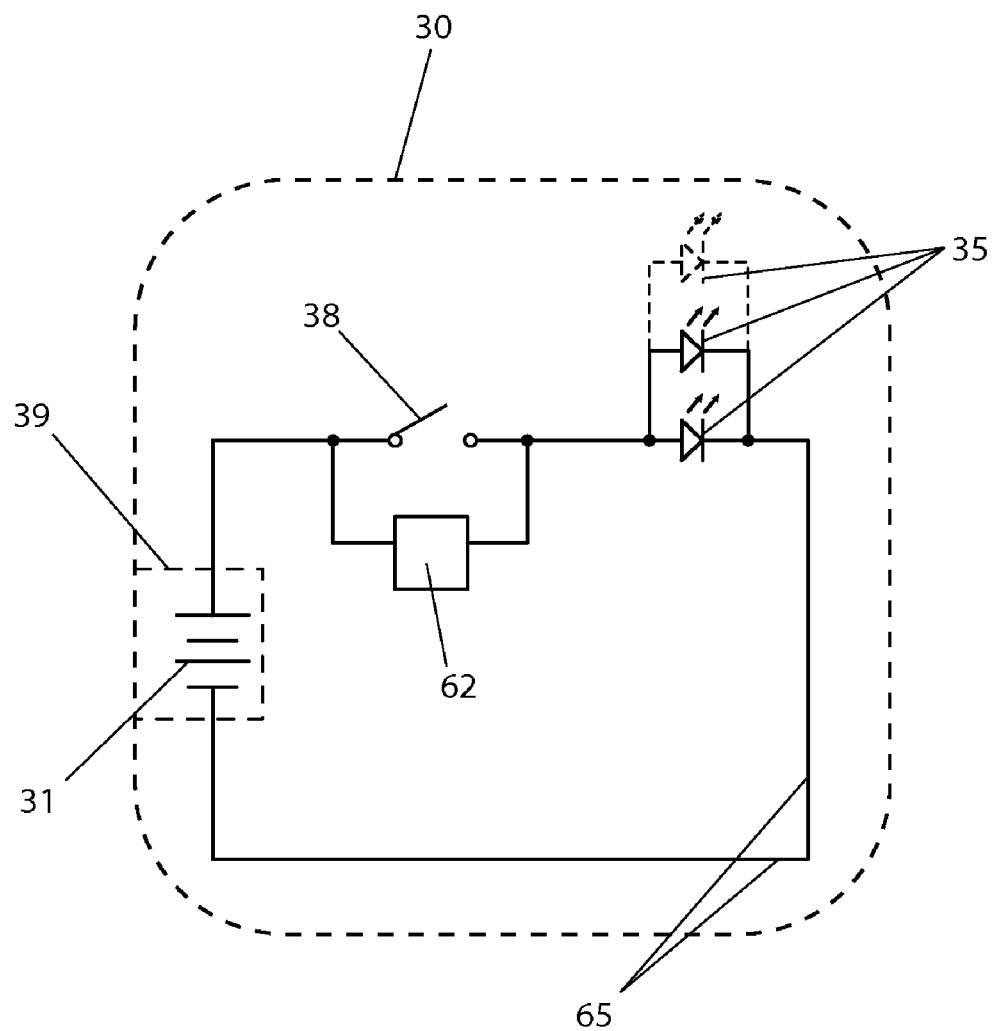
FIG. 8 is an electrical block diagram of the emergency flashlight 30, according to the preferred embodiment of the present invention.

Referring now to FIG. 6, a front perspective view of the emergency flashlight 30, FIG. 7, a side perspective view of the emergency flashlight 30, and FIG. 8, an electrical block diagram of the emergency flashlight 30, according to the preferred embodiment of the present invention are disclosed. The system 10 also comprises an emergency flashlight 30 to provide additional warning to oncoming vehicles 11 or pedestrians. The emergency flashlight 30 comprises a cylindrical body 37 which provides a handheld and stand-able device and would be utilized by a user 14 involved in the accident or other vehicular hazards to illuminate the area in addition to notify other neighboring or oncoming vehicles 11 of the presence of said user 14. The components of the emergency flashlight 30 are similar to those already known in existence.

The flashlight 30 also comprises three (3) retractable legs 32 that may be extended so that said flashlight 30 may be self-supporting. The legs 32 and the body 37 (which acts as the fourth leg) of the flashlight 30 stabilize the emergency flashlight 30 while in an upright position. Each leg 32 is pivotally attached to an upper portion of the body 37 via a pair of semi-circular leg supports 33 and an axle 34.

A bottom surface of the body 37 also comprises a flashlight battery lid 39 which secures a flashlight battery 31 within said body 37. The flashlight battery lid 39 is depicted as being a cylindrical threadably engaging compartment which is removed to access or replace the flashlight battery 31. The flashlight battery 31 is preferably common user replaceable batteries which send current to a plurality of flashlight illumination means 35 which are housed in a transparent plastic upper portion 36. The flashlight illumination means 35 is preferably a series of light-emitting diodes (LED's), yet other illumination devices may be utilized without limiting the scope of the system 10. The transparent upper portion 36 is attached to the body 37 via integral molding and protects the flashlight illumination means 35. The flashlight illumination means 35 may be of any color such as red, blue, yellow, and more without limiting the scope of the system 10. The flashlight illumination means 35 incorporates a plurality of LED's 50 for providing warning solid or flashing illumination.

The flashlight illumination means 35 is controlled via a flashlight power switch 38 which is located on the body 37 and is in electrical communication with the power source, i.e. flashlight battery 31. The flashlight power switch 38 is preferably a multi-positional electronic device, yet other switching devices may be utilized without limiting the scope of the system 10. Also in electrical communication would be a flashlight microprocessor 62 that would allow provide the emergency flashlight 30 with the options to illuminate the area with a solid stream of light, illuminate in a slow flashing rate, illuminate in a high flashing rate, and to be turned off completely. The flashing features of the illumination will increase the likely hood of gathering the attention to those near the scene. The rate at which the flashing will occur could also signify the urgency of the situation. The interconnection of the flashlight battery 31, flashlight power switch 38, flashlight microprocessor 62, and flashlight illumination means 35 is also created via appropriately gauged electrical wiring 65.

Figure 9:
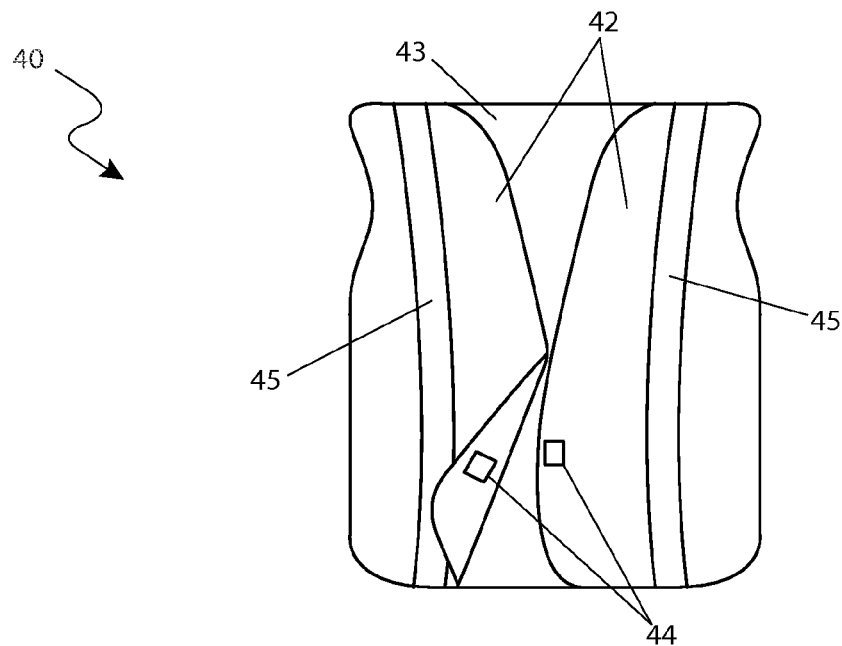
FIG. 9 is a front view of an emergency vest 40, according to the preferred embodiment of the present invention.
Figure 10:
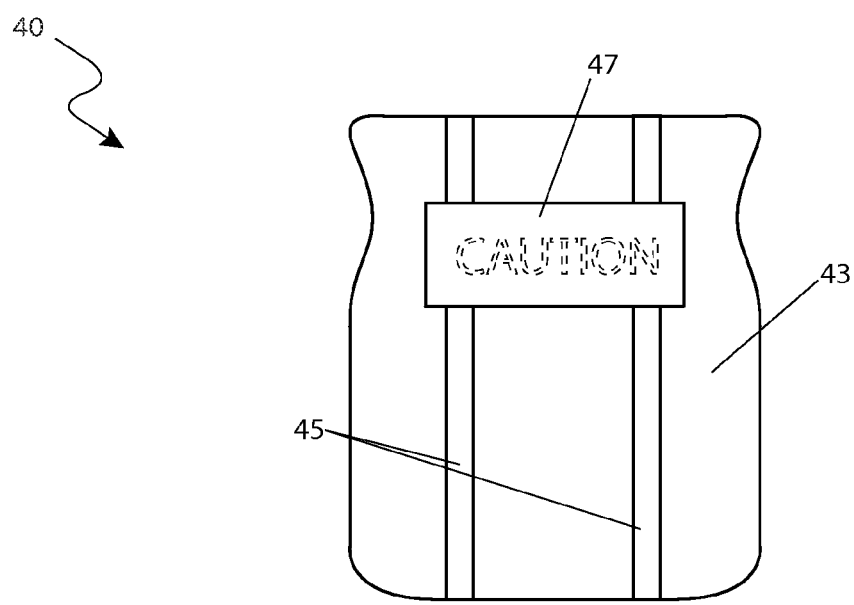
FIG. 10 is a rear view of the emergency vest 40, according to the preferred embodiment of the present invention; and, FIG. 11 is a perspective view of a case 50 depicted in an open state, according to the preferred embodiment of the present invention.

Referring now to FIG. 9, a front view of the emergency vest 40 and FIG. 10, a rear view of the emergency vest 40, according to the preferred embodiment of the present invention are disclosed. The system 10 further comprises is a reflective emergency vest 40 which can be worn by the user 14 or first respondents to a roadside 12 event. The emergency vest 40 would be composed of a front layer 42, a rear layer 43, and reflective striping 45. The emergency vest 40 is fabricated from textiles such as vinyl, urethane and/or any other light, flexible, plastic material capable of withstanding the elements of weather and is worn in a similar fashion to similar devices.

The front layer 42 may be fastened to a closed state (as shown in FIG. 1) with a fastening means 44 which is preferably a hook-and-loop fastener, yet other fastening devices such as, but not limited to: snaps, buttons, or the like may be utilized without limiting the scope of the system 10. The fastening means 44 is depicted as being attached to an intermediate portion of the front layer 42, yet other positions may be utilized.

The reflective striping 45 begins on the front layer 42 and continues over the shoulders onto the rear layer 43. The reflective striping 45 is preferably colored and fabricated to enhance reflectivity. The reflective striping 45 is bonded to the vest 40 by binding means such as sewing, adhering, and/or other suitable affixing means.

The rear layer 43 also comprises warning insignia 47 imprinted in big letters. The warning insignia 47 may depicts words such as "CAUTION" or other similar words or phrases across the rear layer 43 of the vest 40 using the same reflective material as in the reflective striping 45 so that the desired word may be readily seen.

Figure 11:
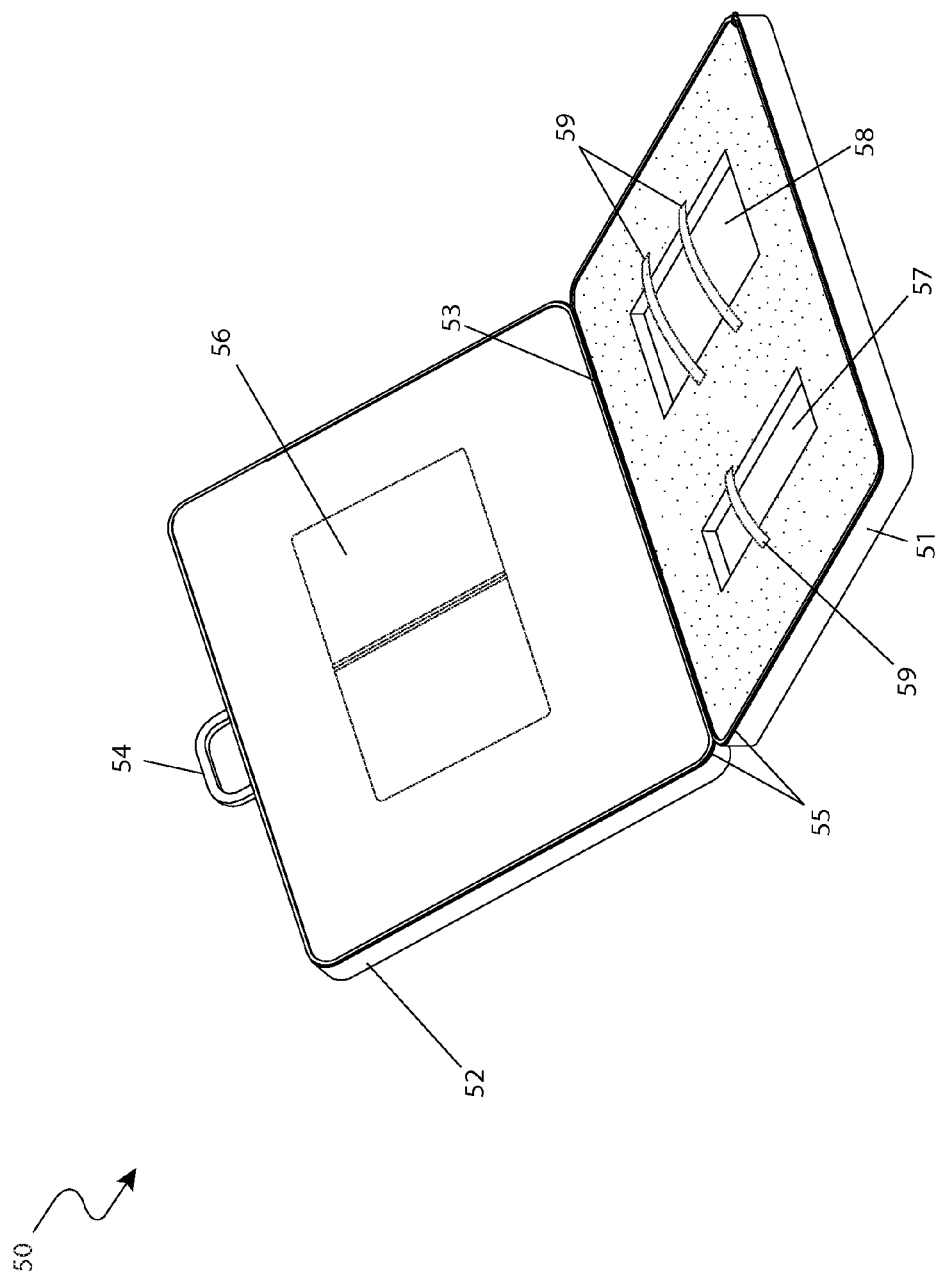

Referring now to FIG. 11, a perspective view of a case 50 depicted in an open state, according to the preferred embodiment of the present invention is disclosed. The emergency triangle 20, emergency flashlight 30, and emergency vest 40 may be stored in a case 50 when not in use and further stored within the vehicle 11 utilized by the user 14. The case 50 is depicted as comprising a rectangular shape further comprising a first shell 51 and a second shell 52. The case 50 measures approximately ten (10) to twelve (12) inches square and measures approximately two (2) inches deep. The shells 51, 52 store and protect the emergency triangle 20, emergency flashlight 30, and emergency vest 40. An exterior of the shells 51, 52 are preferably fabricated from a durable plastic and an interior is preferably fabricated from a foam rubber.

A user 14 transports the case 50 via a handle 54 which is attached to an exterior portion of the second shell 52 although the first shell 51 may also be utilized. The shells 51, 52 open and close about a hinge 53 which enables said shells 51, 52 to pivot to a desired state. The shells 51, 52 further open or close via a zipper 55 which is attached to a perimeter edge of each shell 51, 52 and functions in a normal manner.

The interior of the case 50 comprises a pocket 56 which is utilized to store the emergency vest 40. The interior also comprises a flashlight cavity 57 and a triangle cavity 58 which is utilized to store the emergency flashlight 30 and a collapsed emergency triangle 20, respectively. The cavities 57, 58 may include elastic-type straps 59 to further secure the emergency flashlight 30 and emergency triangle 20 into position.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of utilizing the system 10 may be achieved by performing the following steps: transporting the case 50 to a desired location via the handle 54; opening the case 50 via unzipping the zipper 55 and pivoting the shells 51, 52 about the hinge 53 and away from each other; and, removing the emergency triangle 20, emergency flashlight 30, and emergency vest 40 from the case 50.

The method of utilizing the emergency triangle 20 may be achieved by performing the following steps: positioning the emergency triangle 20 in an upright position via rotating the triangle hinges 28 and securing via the triangle clasping means 29; positioning the emergency triangle 20 on a level surface; activating the triangle illumination means 23 via the triangle power switch 27 to a desired solid or flashing state; positioning the emergency triangle 20 in the desired location, preferably along the roadside 12 behind decommissioned vehicle 11; deactivating the triangle illumination means 23 via the triangle power switch 27 as desired; replacing the triangle battery 26 as desired by accessing the triangle battery compartment 25; and, deactivating the emergency triangle 20 as desired, collapsing, and storing it in a collapsed state in the triangle cavity 58 within the case 50.

The method of utilizing the emergency flashlight 30 may be achieved by performing the following steps: pivoting each leg 32 about the axle 34 and standing the emergency flashlight 30 upon a level surface in an upright orientation; utilizing the flashlight power switch 38 to turn activate the flashlight illumination means 35 a desired solid or flashing state; utilizing the emergency flashlight 30 to illuminate the nearby area in the pointed direction and positioning the emergency flashlight 30 in the desired location, preferably along the roadside 12; replacing the flashlight battery 31 as desired by accessing the flashlight battery lid 39; and, deactivating the emergency flashlight 30 as desired and storing in the flashlight cavity 57 within the case 50.

The method of utilizing the emergency vest 40 may be achieved by performing the following steps: placing the vest 40 onto the user 14 with the front layer 42 upon the chest of said user 14 and the rear layer 43 upon the back of said user 14; fastening via the fastening means 44 as desired; enabling the reflective striping 45 to alert other motorist and pedestrians; and, removing the emergency vest 40 as desired and storing in the pocket 56 of the case 50.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An emergency safety kit, comprising:
    a collapsible triangle, fabricated out of a resilient and weatherproof material, having a front surface and a rear surface, said triangle manipulated between a collapsed state and a deployed state;
    a foldable flashlight, fabricated out of a resilient and weatherproof material, said flashlight manipulated between a folded state and an expanded state;
    a reflective emergency vest, comprising a garment adapted to be wearable by a user; and,
    a carrying case adapted to protect, store, and transport said triangle, said flashlight, and said emergency vest therein;
    wherein said triangle further comprises a triangle illumination means disposed along said front surface thereof;

wherein said flashlight further comprises a flashlight illumination means disposed along an upper surface thereof; and, wherein said triangle illumination means further comprises selectable variable illumination.

2. The emergency safety kit of claim 1, wherein said triangle further comprises:
a center section having a first end and a second end, a first section having a first end hingedly connected to said center section first end, and a second section having a first end hingedly connected to said center section second end, wherein a second end of said first section is removably attached to a second end of said second section with a triangle clasping means to form a triangular housing;
a triangle power supply housed within said center section side accessible by a compartment door accessible along a rear surface thereof;
a triangle power switch in electrical communication with said triangle power supply located on an outer surface of said triangular housing;
a triangle microprocessor in electrical communication with said triangle power;
said triangle illumination means in electrical communication with said triangle microprocessor;
wherein said triangle power switch comprises a multi-position switch to communicate a desired one of said selectable variable illumination;
wherein said triangle microprocessor provides said selectable variable illumination of at least one of the following: continuous illumination, intermittent illumination, and continuous illumination for a predetermined time;
wherein said triangular housing comprises a thickness providing a stable base enabling said triangular housing to rest upon any side; and,
wherein said triangular housing is generally a hollow structure.

3. The emergency safety kit of claim 2, wherein said triangle illumination means further comprises a plurality of LED's arranged in an equidistant position on a front surface of all three sides of said triangular housing;
wherein said plurality of LED's further comprises a lamp socket in electrical communication with said power supply via electrical wiring routed within said triangular housing and a lamp supported within said lamp socket and protruding partially through said front surface of said triangular housing.

4. The emergency safety kit of claim 1, wherein said flashlight further comprises:
a cylindrical flashlight body, comprising:
a transparent upper section, housing said flashlight illumination means therein; and,
a lower section integrally molded to a lower end of said upper section;
three legs pivotally attached to said lower section of said flashlight body via a pair of semi-circular leg supports and an axle;
a flashlight power supply housed with said lower section of said flashlight body in electrical communication with said flashlight illumination means, accessible by a flashlight lid comprising a bottom planar member having a width coextensive with a width of said flashlight body and removably attached thereto;
a flashlight power switch in electrical communication with said flashlight power supply located on an exterior surface of said lower section of said flashlight body;

wherein said flashlight power switch supplies power to said flashlight illumination means; and,
wherein said three legs are extended to provide said extended state of said flashlight to provide a stable support to said flashlight.

5. The emergency safety kit of claim 4, wherein said flashlight illumination means further comprises a plurality of LED's.

6. The emergency safety kit of claim 1, wherein said emergency vest further comprises:
a bifurcated front layer having a fastening means for securing said vest to said user;
a rear layer;
reflective striping located on both said front layer and said rear layer and bonded thereto; and,
reflective indicia located on said rear layer and imprinted in large print.

7. The emergency safety kit of claim 1, wherein said carrying case further comprises:
a generally rectangular first shell having a first edge hingedly attached to a generally rectangular first edge of a second shell, each said first and second shell comprises a durable and weatherproof exterior surface and deformable and protective interior surface;
a securing zipper located on remaining perimeter edges of said first shell and said second shell, thereby permitting access to an interior of said carrying case;
a handle located a central position of a second edge of said second shell opposite said first edge;
a pocket located on an interior of said second shell;
a flashlight cavity located on an interior of said first shell, further having an elastic band attached to said interior on opposing sides of said triangle cavity; and,
a triangle cavity located on said interior of said first shell adjacent to said flashlight cavity, further having an elastic band attached to said interior on opposing sides of said flashlight cavity;
wherein said emergency vest is removably stored within said pocket;
wherein said triangle in said collapsed state is removably stored within said triangle cavity and secured with said elastic band; and,
wherein said flashlight in said folded state is removably stored within said flashlight cavity and secured with said elastic band.

8. An emergency safety kit, comprising:
a collapsible triangle, fabricated out of a resilient and weatherproof material, having a front surface and a rear surface, said triangle manipulated between a collapsed state and a deployed state;
a foldable flashlight, fabricated out of a resilient and weatherproof material, said flashlight manipulated between a folded state and an expanded state;
a reflective emergency vest, comprising a garment adapted to be wearable by a user; and,
a carrying case adapted to protect, store, and transport said triangle, said flashlight, and said emergency vest therein;
wherein said triangle further comprises a triangle illumination means disposed along said front surface thereof;
wherein said flashlight further comprises a flashlight illumination means disposed along an upper surface thereof; and,
wherein said flashlight illumination means further comprises selectable variable illumination.

9. The emergency safety kit of claim 8, wherein said triangle further comprises:

a center section having a first end and a second end, a first section having a first end hingedly connected to said center section first end, and a second section having a first end hingedly connected to said center section second end, wherein a second end of said first section is removably attached to a second end of said second section with a triangle clasping means to form a triangular housing;

a triangle power supply housed within said center section side accessible by a compartment door accessible along a rear surface thereof;

a triangle power switch in electrical communication with said triangle power supply located on an outer surface of said triangular housing;

said triangle illumination means in electrical communication with said triangle power switch;

wherein said triangle power switch supplies power to said triangle illumination means;

wherein said triangular housing comprises a thickness providing a stable base enabling said triangular housing to rest upon any side; and, wherein said triangular housing is generally a hollow structure.

10. The emergency safety kit of claim 9, wherein said triangle illumination means further comprises a plurality of LED's arranged in an equidistant position on a front surface of all three sides of said triangular housing;

wherein said plurality of LED's further comprises a lamp socket in electrical communication with said power supply via electrical wiring routed within said triangular housing and a lamp supported within said lamp socket and protruding partially through said front surface of said triangular housing.

11. The emergency safety kit of claim 8, wherein said flashlight further comprises:

a cylindrical flashlight body, comprising:
  a transparent upper section, housing said flashlight illumination means therein; and,
  a lower section integrally molded to a lower end of said upper section;

three legs pivotally attached to said lower section of said flashlight body via a pair of semi-circular leg supports and an axle;

a flashlight power supply housed with said lower section of said flashlight body in electrical communication with said flashlight illumination means, accessible by a flashlight lid comprising a bottom planar member having a width coextensive with a width of said flashlight body and removably attached thereto;

a flashlight power switch in electrical communication with said flashlight power supply located on an exterior surface of said lower section of said flashlight body; and, a flashlight microprocessor in electrical communication with said flashlight power supply;

wherein said flashlight power switch comprises a multi-position switch to communicate a desired one of said selectable variable illumination;

wherein said flashlight microprocessor provides said selectable variable illumination of at least one of the following: continuous illumination, intermittent illumination, and continuous illumination for a predetermined time; and, wherein said three legs are extended to provide said extended state of said flashlight to provide a stable support to said flashlight.

12. The emergency safety kit of claim 11, wherein said flashlight illumination means further comprises a plurality of LED's.

13. The emergency safety kit of claim 8, wherein said emergency vest further comprises:

a bifurcated front layer having a fastening means for securing said vest to said user;

a rear layer;

reflective striping located on both said front layer and said rear layer and bonded thereto; and, reflective indicia located on said rear layer and imprinted in large print.

14. The emergency safety kit of claim 8, wherein said carrying case further comprises:

a generally rectangular first shell having a first edge hingedly attached to a generally rectangular first edge of a second shell, each said first and second shell comprises a durable and weatherproof exterior surface and deformable and protective interior surface;

a securing zipper located on remaining perimeter edges of said first shell and said second shell, thereby permitting access to an interior of said carrying case;

a handle located a central position of a second edge of said second shell opposite said first edge;

a pocket located on an interior of said second shell;

a flashlight cavity located on an interior of said first shell, further having an elastic band attached to said interior on opposing sides of said triangle cavity; and, a triangle cavity located on said interior of said first shell adjacent to said flashlight cavity, further having an elastic band attached to said interior on opposing sides of said flashlight cavity;

wherein said emergency vest is removably stored within said pocket;

wherein said triangle in said collapsed state is removably stored within said triangle cavity and secured with said elastic band; and, wherein said flashlight in said folded state is removably stored within said flashlight cavity and secured with said elastic band.

15. An emergency safety kit, comprising:

a collapsible triangle, fabricated out of a resilient and weatherproof material, having a front surface and a rear surface, said triangle manipulated between a collapsed state and a deployed state;

a foldable flashlight, fabricated out of a resilient and weatherproof material, said flashlight manipulated between a folded state and an expanded state;

a reflective emergency vest, comprising a garment adapted to be wearable by a user; and, a carrying case, comprising:
  a generally rectangular first shell having a first edge hingedly attached to a generally rectangular first edge of a second shell, each said first and second shell comprises a durable and weatherproof exterior surface and deformable and protective interior surface;
  a securing zipper located on remaining perimeter edges of said first shell and said second shell, thereby permitting access to an interior of said carrying case;
  a handle located a central position of a second edge of said second shell opposite said first edge;
  a pocket located on an interior of said second shell;
  a flashlight cavity located on an interior of said first shell, further having an elastic band attached to said interior on opposing sides of said triangle cavity; and,
  a triangle cavity located on said interior of said first shell adjacent to said flashlight cavity, further having an elastic band attached to said interior on opposing sides of said flashlight cavity;

wherein said triangle further comprises a triangle illumination means disposed along said front surface thereof;

wherein said flashlight further comprises a flashlight illumination means disposed along an upper surface thereof; and, wherein said both said triangle illumination means and said flashlight illumination means further comprises selectable variable illumination;

wherein said carrying case is adapted to protect, store, and transport said triangle in said collapsed state with in said triangle cavity and secured by said elastic band;

wherein said carrying case is adapted to protect, store, and transport said flashlight in said folded state with in said flashlight cavity and secured by said elastic band; and, wherein said carrying case is adapted to protect, store, and transport said emergency vest in said pocket.

16. The emergency safety kit of claim 15, wherein said triangle further comprises:
 a center section having a first end and a second end, a first section having a first end hingedly connected to said center section first end, and a second section having a first end hingedly connected to said center section second end, wherein a second end of said first section is removably attached to a second end of said second section with a triangle clasping means to form a triangular housing;
 a triangle power supply housed within said center section side accessible by a compartment door accessible along a rear surface thereof;
 a triangle power switch in electrical communication with said triangle power supply located on an outer surface of said triangular housing;
 a triangle microprocessor in electrical communication with said triangle power;
 said triangle illumination means in electrical communication with said triangle microprocessor;
 wherein said triangle power switch comprises a multi-position switch to communicate a desired one of said selectable variable illumination;
 wherein said triangle microprocessor provides said selectable variable illumination of at least one of the following: continuous illumination, intermittent illumination, and continuous illumination for a predetermined time;
 wherein said triangular housing comprises a thickness providing a stable base enabling said triangular housing to rest upon any side; and,
 wherein said triangular housing is generally a hollow structure.

17. The emergency safety kit of claim 16, wherein said triangle illumination means further comprises a plurality of LED's arranged in an equidistant position on a front surface of all three sides of said triangular housing;
 wherein said plurality of LED's further comprises a lamp socket in electrical communication with said power supply via electrical wiring routed within said triangular housing and a lamp supported within said lamp socket and protruding partially through said front surface of said triangular housing.

18. The emergency safety kit of claim 15, wherein said flashlight further comprises:
 a cylindrical flashlight body, comprising:
  a transparent upper section, housing said flashlight illumination means therein; and,
  a lower section integrally molded to a lower end of said upper section;
 three legs pivotally attached to said lower section of said flashlight body via a pair of semi-circular leg supports and an axle;
 a flashlight power supply housed with said lower section of said flashlight body in electrical communication with said flashlight illumination means, accessible by a flashlight lid comprising a bottom planar member having a width coextensive with a width of said flashlight body and removably attached thereto;
 a flashlight power switch in electrical communication with said flashlight power supply located on an exterior surface of said lower section of said flashlight body; and,
 a flashlight microprocessor in electrical communication with said flashlight power supply;
 wherein said flashlight power switch comprises a multi-position switch to communicate a desired one of said selectable variable illumination;
 wherein said flashlight microprocessor provides said selectable variable illumination of at least one of the following: continuous illumination, intermittent illumination, and continuous illumination for a predetermined time; and,
 wherein said three legs are extended to provide said extended state of said flashlight to provide a stable support to said flashlight.

19. The emergency safety kit of claim 18, wherein said flashlight illumination means further comprises a plurality of LED's.

20. The emergency safety kit of claim 15, wherein said emergency vest further comprises:
 a bifurcated front layer having a fastening means for securing said vest to said user;
 a rear layer;
 reflective striping located on both said front layer and said rear layer and bonded thereto; and,
 reflective indicia located on said rear layer and imprinted in large print.

* * * * *